United States Patent
Geissenhoener

(10) Patent No.: US 9,623,839 B2
(45) Date of Patent: Apr. 18, 2017

(54) MOTOR VEHICLE HAVING A WIRELESS KEY, AND METHOD FOR OPERATING

(71) Applicant: AUDI AG, Ingolstadt (DE)

(72) Inventor: Martin Geissenhoener, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/916,975

(22) PCT Filed: Jul. 29, 2014

(86) PCT No.: PCT/EP2014/002071
§ 371 (c)(1),
(2) Date: Mar. 4, 2016

(87) PCT Pub. No.: WO2015/032460
PCT Pub. Date: Mar. 12, 2015

(65) Prior Publication Data
US 2016/0207499 A1      Jul. 21, 2016

(30) Foreign Application Priority Data

Sep. 6, 2013 (DE) .......... 10 2013 014 890

(51) Int. Cl.
*B60R 25/24* (2013.01)
*B60R 25/04* (2013.01)

(52) U.S. Cl.
CPC .............. *B60R 25/24* (2013.01); *B60R 25/04* (2013.01); *B60R 2325/103* (2013.01)

(58) Field of Classification Search
CPC .... B60R 25/04; B60R 25/24; B60R 2325/103
(Continued)

(56) References Cited

U.S. PATENT DOCUMENTS 6,778,097 B1 *   8/2004   Kajita ................ E02F 3/437
                                                            340/12.5
7,079,020 B2 *   7/2006   Stilp .................. G06K 7/0008
                                                            340/506
(Continued)

FOREIGN PATENT DOCUMENTS

DE      198 02 532 C1      8/1999
DE      100 24 852 C1      11/2001
(Continued)

OTHER PUBLICATIONS

German Office Action for Application No. 102013014890.1 dated Jun. 23, 2014.
(Continued)

*Primary Examiner* — Atul Trivedi
(74) *Attorney, Agent, or Firm* — Staas & Halsey LLP

(57) ABSTRACT

A first detection device detects radio waves from a wireless key. A second detection device has a smaller detection range than the first detection device also detects radio waves from the key. The operation of an operator control element for switching the motor vehicle on and/or off performs a search process using the first detection device and then, if a key associated with the motor vehicle has not been found by the first detection device, performance of a search process using the second detection device from a fallback instant. Subsequent to the fallback instant the first and second detection devices perform a search process at least intermittently in parallel or alternately.

20 Claims, 2 Drawing Sheets

(58) Field of Classification Search
USPC .......................................................... 701/2
See application file for complete search history.

(56) References Cited

U.S. PATENT DOCUMENTS

| | | | | |
|---|---|---|---|---|
| 7,612,650 | B2* | 11/2009 | Nakashima | B60R 25/24 340/10.1 |
| 8,378,800 | B2* | 2/2013 | Mackjust | B60R 25/10 123/179.2 |
| 8,452,465 | B1* | 5/2013 | Sinha | G05B 19/0428 365/189.08 |
| 2005/0020212 | A1* | 1/2005 | Hiramitsu | B60R 25/245 455/41.2 |
| 2005/0273218 | A1* | 12/2005 | Breed | B60C 11/24 701/2 |
| 2006/0022795 | A1 | 2/2006 | Nakamura et al. | |
| 2006/0043181 | A1* | 3/2006 | Naito | B60R 25/24 235/443 |
| 2006/0187007 | A1* | 8/2006 | Konno | B60R 25/24 340/426.15 |
| 2008/0086241 | A1* | 4/2008 | Phillips | G05D 1/0038 701/2 |
| 2009/0259349 | A1* | 10/2009 | Golenski | G08G 1/205 701/2 |
| 2010/0305779 | A1* | 12/2010 | Hassan | G01C 17/38 701/2 |
| 2011/0010023 | A1* | 1/2011 | Kunzig | G01S 5/16 701/2 |
| 2012/0046807 | A1* | 2/2012 | Ruther | B60R 25/24 701/2 |
| 2012/0089299 | A1* | 4/2012 | Breed | B60C 11/24 701/36 |
| 2012/0253553 | A1* | 10/2012 | Nagata | B60Q 3/0293 701/2 |
| 2013/0261846 | A1* | 10/2013 | McQuade | G06F 17/00 701/2 |
| 2016/0191158 | A1* | 6/2016 | Aoyama | H04B 10/1149 398/172 |

FOREIGN PATENT DOCUMENTS

| | | |
|---|---|---|
| DE | 102 34 231 A1 | 2/2004 |
| DE | 10 2004 026 815 A1 | 1/2005 |
| DE | 10 2005 035 167 A1 | 3/2006 |
| DE | 102005034097 A1 | 8/2006 |
| DE | 10 2005 035 934 A1 | 2/2007 |
| DE | 102006008146 A1 | 8/2007 |
| DE | 102007044871 A1 | 4/2009 |
| DE | 102010054593 A1 | 12/2011 |
| DE | 102010034977 A1 | 2/2012 |
| DE | 102013014890.1 | 9/2013 |
| DE | 102011107998 A1 | 10/2013 |
| EP | 1 099 814 A1 | 5/2001 |
| EP | 1 201 514 A1 | 5/2002 |
| EP | 1 533 450 A1 | 5/2002 |
| EP | 1 346 888 A2 | 9/2003 |
| EP | 1 046 557 B1 | 5/2005 |
| WO | PCT/EP2014/002071 | 7/2014 |

OTHER PUBLICATIONS

International Search Report for PCT/EP2014/002071 mailed Dec. 11, 2014.
WIPO translation of International Preliminary Examination Report on Patentability for PCT/EP2014/002071 dated Mar. 10, 2016.
Office Action dated Nov. 16, 2016 in corresponding German Patent Application No. 10 2013 014 890.1.

* cited by examiner

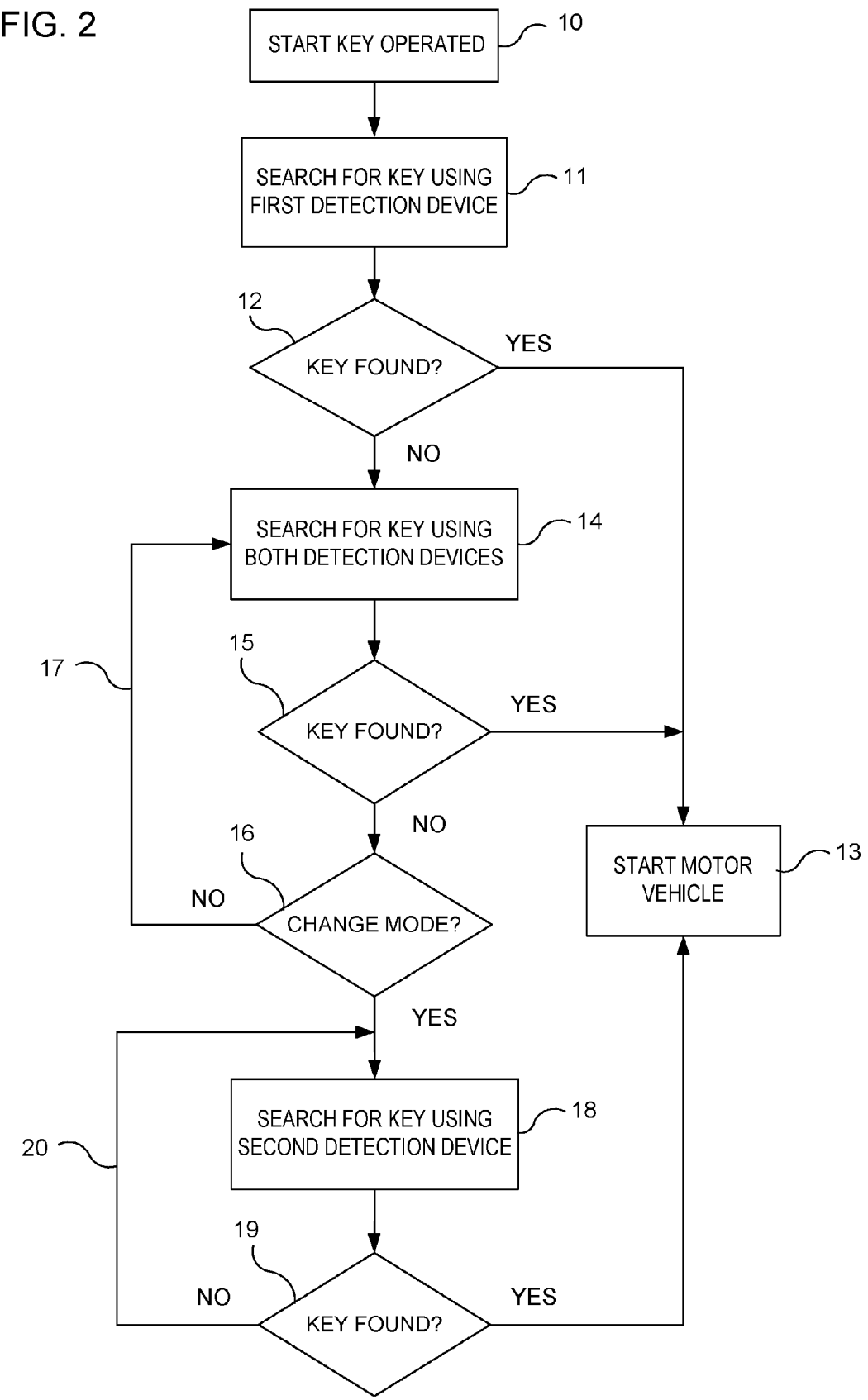

MOTOR VEHICLE HAVING A WIRELESS KEY, AND METHOD FOR OPERATING

CROSS REFERENCE TO RELATED APPLICATIONS

This application is the U.S. national stage of International Application No. PCT/EP2014/002071 filed on Mar. 12, 2015. This International Application claims the benefit of German Application No. 10 2013 014 890.1 filed on Sep. 6, 2013, both applications are incorporated by reference herein in their entirety.

BACKGROUND

Described below is a method for operating a motor vehicle having a first detection device, which uses radio waves, for a wireless key and a second detection device, which has a smaller detection range than the first detection device, for the key, wherein operation of an operator control element for switching the motor vehicle on and/or off is followed by performance of a search process using the first detection device and then, if a key associated with the motor vehicle has not been found by the first detection device, performance of a search process using the second detection device from a fallback instant. In addition, a description is provided of a motor vehicle in which the method is used.

Vehicle systems have already been proposed in the related art that allow the motor vehicle to be unlocked without using a key and/or allow the motor vehicle to be started without using a key. In this case, a wireless key associated with the motor vehicle is used, which the driver or the person locking and/or unlocking the motor vehicle, possibly even a passenger, carries with him such that the key can be detected by the motor vehicle. The underlying detection in this case is effected wirelessly using radio signals, such a key possibly including a chip, for example, an HFID chip.

If the presence of the key associated with the motor vehicle is supposed to be detected, for example because an operator control element for starting the motor vehicle has been operated, a first detection device becomes active, for example when actuated by a controller of the motor vehicle. The first detection device uses radio signals that cover the entire motor vehicle, possibly even an area outside the motor vehicle. In addition, for some applications it is desirable to obtain a location statement for the position of the wireless key as well.

A first detection device can include a plurality of transmission devices installed in the motor vehicle that transmit a request signal on a first frequency or in a first frequency band, which request signal is received by the key and may also contain the power for operating the key. Otherwise, the wireless key may also contain a battery or some other energy store. Following transmission of the request signal, a reception mode is activated in which a plurality of reception devices distributed over the motor vehicle, which may correspond to the transmission devices (transmission/reception devices), await an identification signal from the key as a response signal.

When the key or the transponder that is present in the key receives the request signal, provision may be made for the request signal to be decoded and output again with new coding in a different frequency band. By way of example, the request signal can be transmitted on an LF frequency in the region of 20 kHz, whereas the response signal used as an identification signal may be in the HF band or in the UHF band. The reception devices receive the response signal used as an identification signal and forward it to the controller, which checks whether the received, coded identification signal, which therefore contains a piece of identification information as a result of the coding, is coded correctly, and has therefore been transmitted by the key associated with the motor vehicle. If the check is positive, a key associated with the motor vehicle has been detected wirelessly (and therefore a key has been detected and authenticated), and the motor vehicle can be unlocked and started, for example.

In this case, the use of a plurality of reception devices has the advantage that it is also possible to establish the band that contains the key, for example using propagation time differences and/or by evaluating signal strengths and the like. By way of example, it is thus possible to establish whether the key is inside the motor vehicle or outside the motor vehicle.

If, when an operator control element for switching the motor vehicle on and/or off is operated, the search process using the first detection device does not detect a key associated with the motor vehicle, this can have various causes. By way of example, a short-term interference source is possible in radio communication (HF or LF). It is also conceivable for the key not yet to be in the motor vehicle, for example if the passenger who is carrying the key has not yet got in. A third possibility is that the energy store associated with the transponder of the key, for example a battery, is flat. Finally, a system error is also conceivable. So as nevertheless to allow the motor vehicle to be activated, the use of a second detection device that is based on a different wireless principle has been proposed as a fall-back solution. Therefore, if the key associated with the motor vehicle is not found using the first detection device, an instruction to use the second detection device is output to the user and the second detection device is activated. In this case, the second detection device is usually based on a much smaller detection range than the first detection device. By way of example, the second detection device may include a transponder coil that excites a second transponder of the key, and/or may be in the form of an NFC (near field communication) device, and could therefore have a range of 10 cm or less. The second detection device then has an associated area in the interior of the motor vehicle, with the driver being informed by the instruction that the wireless key now needs to be taken to this area in the detection range of the second detection device. By way of example, it is conceivable for a transponder coil of the second detection device to be arranged behind a cover. Attempts are therefore now made to find and authenticate the key associated with the motor vehicle using the second detection device. Therefore, a permanent switch is made to a search process using the second detection device. The key may be provided with a second transponder that is associated with the second detection device, or the first transponder of the key, which transponder is associated with the first detection device, may also be associated with the second detection device. When the key associated with the motor vehicle is found using the second detection device, the motor vehicle is switched on.

A disadvantage in this case is that the user imperatively must bring the wireless key into the detection range of the second detection device in order to detect the motor vehicle, even if there is only short-term interference or the operator control element has simply been operated too early.

SUMMARY

Described below is a method for searching for a wireless key associated with the motor vehicle that is better suited to the driver and to error detection in terms of convenience.

The method is of the type cited at the outset, but provides that from the fallback instant the first and second detection devices perform a search process at least intermittently in parallel or alternately.

This means, in contrast to the related art, that the first detection device is not deactivated completely but rather the second detection device continues to be operated in parallel or between search processes, so that the user does not necessarily have to bring the wireless key into the detection range of the second detection device when a temporary error has resulted in the key associated with the motor vehicle not being detected by the first detection device. Examples of such short-term errors are short-term interference in the radio communication of the first detection device, where both the request signal and the response signal used as an identification signal can be affected, bringing the wireless key associated with the motor vehicle into the motor vehicle too late, for example a passenger getting in belatedly, and a temporary system error. Since the search processes run in parallel or virtually in parallel, the user does not necessarily need to bring the key into detection range of the second detection device in such cases. The search strategy adapts itself to the vehicle condition and affords optimum convenience.

In this case, as described at the outset, the first detection device used is usually a standard detection device, which uses radio signals, having a plurality of transmission devices and reception devices, which may be combined transmission/reception devices, that transmit a request signal in a first frequency band that is received by a first transponder of the key, after which a response signal used as an identification signal is output in a second frequency band and received again by the transmission/reception devices of the first detection device. There, the coding of the identification signal can be checked, for example, in order to establish whether a key associated with the motor vehicle is involved. In this case, the detection range of the first detection device may extend over the whole interior of the motor vehicle. The second detection device addresses a second transponder of the key, which may also be realized in the physical unit with the first transponder. Generally, the second detection device has a much smaller detection range than the first detection device, since it is geared particularly to receiving a response signal even when an energy store associated with the first transponder, particularly a battery, is flat, for example.

In a first embodiment, the second detection device may include a transponder coil that transmits an excitation signal that supplies the second transponder with power and prompts it to generate a response signal on its part. However, other embodiments of the second detection device are also conceivable, for example an embodiment as an NFC device. In any case, the detection range of the second detection device is much smaller than the detection range of the first detection device, with particularly the second detection device having a detection range with an extent of 10 cm or less than 10 cm.

Embodiments are known in which an element of the first detection device is also used as or in the second detection device. By way of example, it has been proposed for a transmission/reception device in the center console of a motor vehicle, which center console is associated with the first detection device, to be used as a transponder coil of the second detection device. In such an embodiment, it is not possible for search processes to be performed using the first and second detection devices simultaneously, since the corresponding transmission/reception device would then be in dual use. For this case, the method proposes alternate search processes using the first and second detection devices. If the first and second detection devices can be operated independently of one another, however, it is possible for search processes to be performed in parallel. At the fallback instant, although the second detection device provided as a fallback level is thus activated and used, a search is also performed at least intermittently using the first detection device too.

In an embodiment, provision may be made that the fallback instant is followed, from a switching instant at which a key associated with the motor vehicle has not been found for a predetermined period of time or a predetermined number of search processes, by the use of only the second detection device for search processes. If the key associated with the motor vehicle has not been identified using the first detection device for a predetermined period of time or repeatedly in succession, it can be assumed that there is a longer-lasting error, for example the battery of the key is flat or there is an error in the system. In this case, it is expedient to change over permanently to searching using the second detection device, since it can no longer be assumed that success will be achieved using the first detection device, the detection range of which covers the whole motor vehicle, of course.

In this case, the predetermined number used is 3 to 6, particularly 5, or the predetermined period of time used may be 8 to 12, particularly 10, seconds. Most short-term errors ought by then to have ended.

At the switching instant an error entry for the first detection device may be written to an error memory and/or an error message indicating a possible fault in the first detection device or a flat key battery is output. Error memories are already known in the related art and can be read during servicing, for example, so that appropriate measures can therefore be initiated at least when the key is repeatedly not found using the first detection device. In addition, it may also be expedient to output advice to the user that the key has not been able to be found using the first detection device, that the energy store, particularly the battery, of the key is flat and/or there is another fault, particularly in the region of the first detection device.

As is fundamentally known in the related art, it is also expedient if at the fallback instant an instruction for use of the second detection device is output to the user, so that, particularly after a particular period in which the user waits to see whether the first detection device does in fact successfully detect the key associated with the motor vehicle, for example when a passenger with the wireless key gets in belatedly, the key needs to be brought into the detection range of the second detection device.

To implement the method, a motor vehicle has a first detection device, which uses radio waves, for a wireless key, a second detection device, which has a smaller detection range than the first detection device, for the key and a controller that is designed to carry out the method. All explanations concerning the method can be transferred in similar fashion to the motor vehicle, which can be used to attain the advantages already cited.

BRIEF DESCRIPTION OF THE DRAWINGS

Further advantages and details will emerge from the exemplary embodiments described below and with reference to the drawings, in which:

FIG. 2 is a flowchart for an exemplary embodiment of the method.

DETAILED DESCRIPTION OF THE PREFERRED EMBODIMENT

Figure 1:
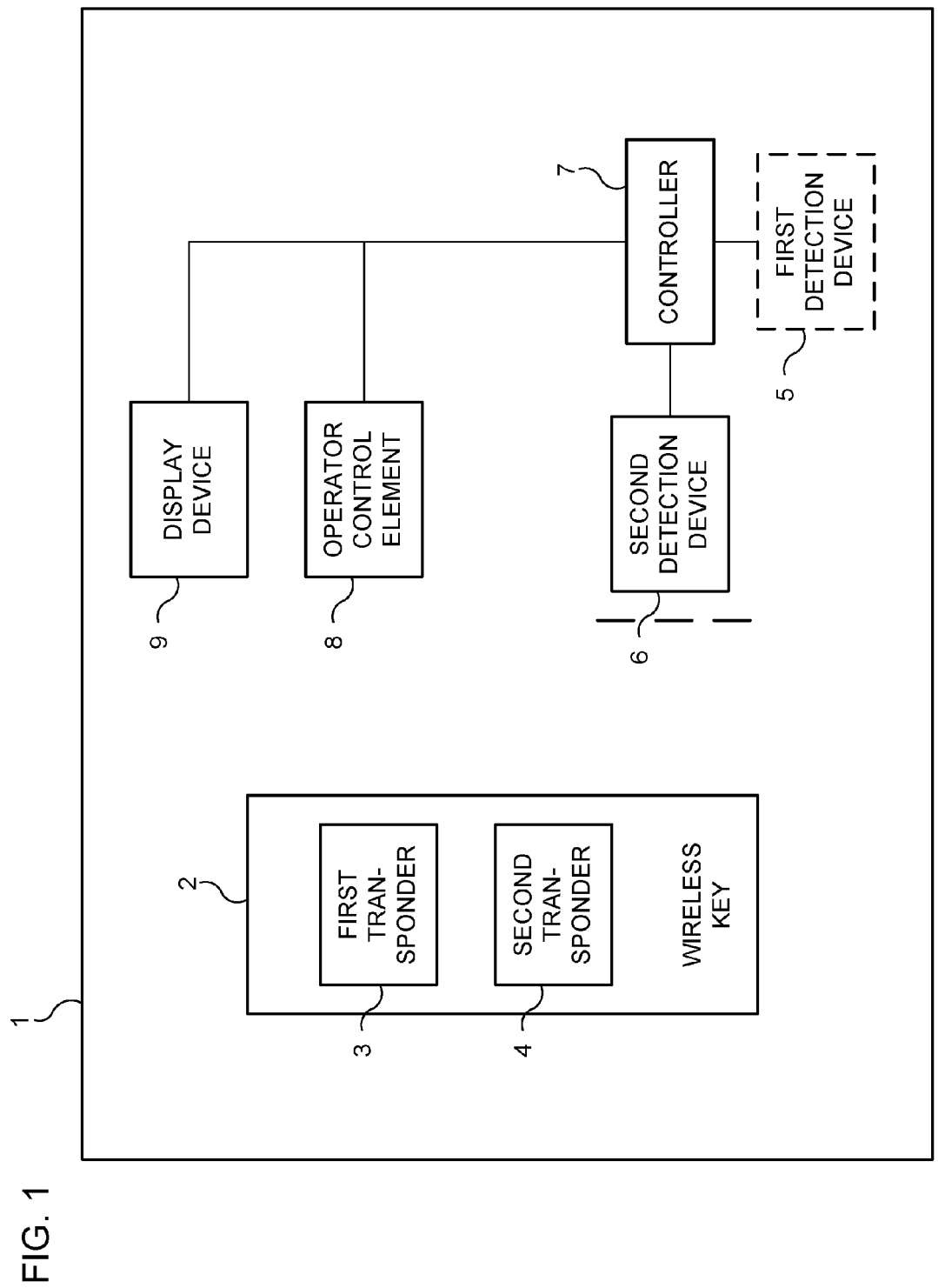
FIG. 1 is a block diagram of a motor vehicle.

Reference will now be made in detail to the preferred embodiments, examples of which are illustrated in the accompanying drawings, wherein like reference numerals refer to like elements throughout.

FIG. 1 is a block diagram of a motor vehicle 1. The motor vehicle 1 has an associated wireless key 2 that no longer needs to be used explicitly, that is to say inserted into an ignition lock or the like and possibly rotated, in order to start the motor vehicle 1. Instead, it is entirely sufficient for a person who is in the motor vehicle 1 to carry the key 2 when the motor vehicle 1 needs to be started.

In order to be able to detect the key 2 wirelessly, the key 2 in the present case has a first transponder 3 and a second transponder 4, the first and second transponders 3, 4 also being able to be realized in the form integrated in one another as one component. The transponder 4 is a kind of emergency transponder, that is to say that it is used as a fallback solution when detection using the first transponder 3 is not possible.

Accordingly, the motor vehicle 1 first of all has a first detection device 5—indicated only schematically—that uses radio signals. The detection range of the first detection device 5 includes the whole interior of the motor vehicle 1. When the key 2 needs to be detected, a request signal is transmitted in a first frequency band, particularly an LF frequency band, and is received by the transponder 3 and transmitted again in recoded form as an identification signal. For the sake of clarity, the detection device 5 has transmission/reception devices—not shown in more detail here—that are distributed over the motor vehicle 1 and can therefore receive the identification signal transmitted by the first transponder 3 again. Following evaluation, for example using a controller 7 associated with the wireless key system, it can therefore be established whether the key 2 is a key 2 associated with the motor vehicle 1.

If the first detection device does not work, it still needs to be possible, by way of example, to switch on the motor vehicle 1 following operation of an appropriate operator control element 8, for example a start/stop key. Therefore, as already indicated, a second detection device 6, which in the present case has a transponder coil situated behind a cover in the center console of the motor vehicle, is provided as a fallback level. The transponder coil is tuned to the second transponder 4, and also transmits power to the second transponder 4 in the form of an excitation signal in order to allow the response signal from the second transponder. Such transponder coils are already fundamentally known for checking keys from ignition locks. The second detection device 6 has, on the basis of its principle, a much smaller detection range, for example in the range of up to 10 cm. In order for the second detection device 6 to be able to be used, it is therefore necessary to bring the key 2 into the detection range of the second detection device 6, for example to hold it to the cover indicated in FIG. 1.

The controller 7 is designed to perform the method and can therefore actuate the first detection device 5 and the second detection device 6 to perform search processes when the operator control element 8 has been operated, for example for the purpose of starting the motor vehicle 1. In addition, the controller 7 has access to a display device 9 in order to output instructions for use of the second detection device 6 and/or error messages.

An exemplary embodiment of the method, as can be performed by the controller 7, is shown in more detail in the flowchart in FIG. 2. The method begins at 10 by ascertaining that the operator control element 8 has been operated, for example has been pushed as a start key. In 11, a search process then takes place using the detection device 5, as has been described.

In 12, a check is then performed to determine whether a key 2 associated with the motor vehicle 1 has been found in the motor vehicle 1. If this is the case, the method continues with 13 and the motor vehicle 1 is switched on.

If a key 2 associated with the motor vehicle has not been detected in check 12, however, a fallback condition has arisen that justifies the use of the second detection device 6 as a fallback level. At a fallback instant, there is therefore a switch to a second mode of operation, in which, in the present case, search processes 14 using the first detection device 5 and the second detection device 6 are performed in parallel. Should the embodiment of the first detection device 5 and of the second detection device 6, for example elements used by both detection devices 5, 6, mean that it is impossible to perform search processes with both detection devices 5, 6 in parallel, search processes with the first detection device 5 and the second detection device 6 are performed alternately.

In 15, a fresh check is performed to determine whether a wireless key 2 associated with the motor vehicle 1 has been found using one of the two detection devices 5, 6. If this is the case, the method again continues with 13 and the motor vehicle 1 is switched on.

If a key 2 associated with the motor vehicle 1 is again not detected, however, the method continues with 16, where a check is performed to determine whether there is a switching condition for switching to a third mode of operation. In the present case, a check is performed to determine whether there have already been four attempts to detect the key 2 using the first detection device 5. If the switching condition has not yet been satisfied, the method again continues with 14, that is to say that a search process using both detection devices 5, 6 takes place in parallel or alternately, cf. arrow 17.

If the switching condition is satisfied, however, a third mode of operation 18 is activated, in which the search for the key 2 is effected only using the second detection device 6, since a longer-term error must be assumed for the first detection device 5, for example a flat battery in the key 2 or even a system error. It is possible for an entry to be made in an error memory and/or for an error message to be output via the display device 9 in this regard.

In 19, a check is again performed to determine whether a key 2 associated with the motor vehicle 1 has now been detected only using the second detection device 6 in this case. If this is the case, the method continues with switching the vehicle on at 13, otherwise a further search process using the second detection device 6 is started, via arrow 20.

At this juncture, it should also be noted that activation of the second mode of operation, that is to say the parallel search using the first and second detection devices 5, 6, also prompts the display device 9 to be used to output an appropriate instruction that the key 2 needs to be brought into the detection range of the second detection device 6.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a motor vehicle having a first detection device detecting radio waves transmitted by a wireless key and a second detection device having a smaller detection range than the first detection device for the wireless key, comprising:
   detecting operation of an operator control element indicating a request for change in operation status of the motor vehicle;
   performing a first search process by processing the radio waves in the first detection device in response to said detecting;
   performing, when the wireless key associated with the motor vehicle has not been found by the first search process, a second search process from a fallback instant using the first and second detection devices one of continuously and intermittently and one of in parallel and alternately;
   performing, at a switching instant when the wireless key associated with the motor vehicle has not been found for at least one of a predetermined period of time and a predetermined number of search processes using the first and second search processes after the fallback instant, a third search process using only the second detection device; and
   operating a control device in the motor vehicle after detection of the wireless key.

2. The method as claimed in claim 1, wherein the predetermined number is 3 to 6.

3. The method as claimed in claim 2, wherein the predetermined number is 5.

4. The method as claimed in claim 1, wherein the predetermined period of time is 8 to 12 seconds.

5. The method as claimed in claim 4, wherein the predetermined period of time is 10 seconds.

6. The method as claimed in claim 1, further comprising writing, at the switching instant, an error entry for the first detection device to an error memory.

7. The method as claimed in claim 1, further comprising outputting, at the switching instant, an error message indicating at least one of a possible fault in the first detection device and a flat key battery.

8. The method as claimed in claim 1, further comprising outputting to the user, at the fallback instant, an instruction for use of the second detection device.

9. The method as claimed in claim 1, further comprising one of starting and stopping operation of the motor vehicle in response to the request for change in operation status of the motor vehicle.

10. A motor vehicle having an operator control element and a wireless key associated therewith, comprising:
    a first detection device detecting and processing radio waves transmitted by the wireless key;
    a second detection device having a smaller detection range than the first detection device for detecting the wireless key; and
    a controller programmed to perform a method including
       detecting operation of the operator control element indicating a request for change in operation status of the motor vehicle;
       performing a first search process using the first detection device in response to the request for change in operation status;
       performing, when the wireless key has not been found by the first search process, a second search process from a fallback instant using the first and second detection devices, one of in parallel and alternately, at least intermittently; and
       performing, at a switching instant when the wireless key has not been found for at least one of a predetermined period of time and a predetermined number of search processes using the first and second search processes after the fallback instant, a third search process using only the second detection device.

11. The motor vehicle as claimed in claim 10, wherein the predetermined number is 3 to 6.

12. The motor vehicle as claimed in claim 11, wherein the predetermined number is 5.

13. The motor vehicle as claimed in claim 10, wherein the predetermined period of time is 8 to 12 seconds.

14. The motor vehicle as claimed in claim 13, wherein the predetermined period of time is 10 seconds.

15. The motor vehicle as claimed in claim 10, wherein the method further comprises writing, at the switching instant, an error entry for the first detection device to an error memory.

16. The motor vehicle as claimed in claim 10, wherein the method further comprises outputting, at the switching instant, an error message indicating at least one of a possible fault in the first detection device and a flat key battery.

17. The motor vehicle as claimed in claim 10, wherein the method further comprises outputting to the user, at the fallback instant, an instruction for use of the second detection device.

18. The motor vehicle as claimed in claim 10,
    wherein the first detection device exchanges radio signals with a first transponder of the wireless key, and
    wherein the second detection device receives a response signal from a second transponder of the wireless key, even when an energy store associated with the first transponder is depleted.

19. The motor vehicle as claimed in claim 10, further comprising a control element configured to start and stop operation of the motor vehicle in response to the request for change in operation status of the motor vehicle.

20. The motor vehicle as claimed in claim 10,
    further comprising at least one antenna receiving radio waves transmitted by the wireless key, and
    wherein the first detection device is coupled to the at least one antenna and detects the radio waves received by the antenna.

* * * * *

UNITED STATES PATENT AND TRADEMARK OFFICE
CERTIFICATE OF CORRECTION

PATENT NO. : 9,623,839 B2  
APPLICATION NO. : 14/916975  
DATED : April 18, 2017  
INVENTOR(S) : Martin Geissenhoener It is certified that error appears in the above-identified patent and that said Letters Patent is hereby corrected as shown below:

In the Specification

Column 1, Line 8-9: Delete "March 12, 2015." and insert -- July 29, 2014. --, therefore.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*